(12) United States Patent
Hess et al.

(10) Patent No.: US 11,139,516 B2
(45) Date of Patent: Oct. 5, 2021

(54) BATTERY CELL MODULE

(71) Applicant: BAE Systems Controls Inc., Endicott, NY (US)

(72) Inventors: Robert Hess, Seneca Falls, NY (US); Loren Early, Downsville, NY (US); Peter Minni, Endwell, NY (US)

(73) Assignee: BAE Systems Controls Inc., Endicott, NY (US)

( * ) Notice: Subject to any disclaimer, the term of this patent is extended or adjusted under 35 U.S.C. 154(b) by 28 days.

(21) Appl. No.: 16/404,285

(22) Filed: May 6, 2019

(65) Prior Publication Data
US 2020/0358155 A1    Nov. 12, 2020

(51) Int. Cl.
| | |
|---|---|
| *H01M 10/6555* | (2014.01) |
| *H01M 10/0525* | (2010.01) |
| *H01M 10/613* | (2014.01) |
| *H01M 10/625* | (2014.01) |
| *H01M 10/647* | (2014.01) |
| *H01M 10/6551* | (2014.01) |
| *H01M 2/10* | (2006.01) |
| *H01M 50/20* | (2021.01) |

(52) U.S. Cl.
CPC ... *H01M 10/6555* (2015.04); *H01M 10/0525* (2013.01); *H01M 10/613* (2015.04); *H01M 10/625* (2015.04); *H01M 10/647* (2015.04); *H01M 10/6551* (2015.04); *H01M 50/20* (2021.01); *H01M 2220/20* (2013.01)

(58) Field of Classification Search
CPC ........... H01M 10/655; H01M 10/6551; H01M 10/6554; H01M 10/6555; H01M 50/211
See application file for complete search history.

(56) References Cited

U.S. PATENT DOCUMENTS

| | | |
|---|---|---|
| 8,877,366 B2 | 11/2014 | Weber et al. |
| 9,160,038 B2 | 10/2015 | Buck et al. |
| 9,203,064 B2 | 12/2015 | Lee et al. |
| 10,199,695 B2 | 2/2019 | Lobert et al. |

(Continued)

OTHER PUBLICATIONS

International Search Report, PCT/US20/31462, dated Jul. 30, 2020, 9 pages.

*Primary Examiner* — Ula C Ruddock
*Assistant Examiner* — Matthew W Van Oudenaren
(74) *Attorney, Agent, or Firm* — Scully Scott Murphy & Presser PC; Scott J. Asmus

(57) ABSTRACT

A battery cell module includes a housing having a stack of a plurality of battery cells. The stack includes a plurality of battery cells sequentially stacked within the housing. Each of the battery cells has first and second opposed faces. The stack further includes a plurality of heat sink plates sequentially interleaved between the plurality of battery cells. Each of the plurality of heat sink plates has a body extending in a first plane surrounded by an outer edge. The body has a plurality of mounting tabs arranged to support a respective battery cell in the sequential stack within the housing such that the plurality of battery cells are maintained in alignment within the housing. A method includes sequentially interleaving battery cells and heat sink plates within a housing, where mounting tabs in the heart sink plates maintain the battery cells in alignment within the housing.

19 Claims, 4 Drawing Sheets

(56) References Cited

U.S. PATENT DOCUMENTS

| | | | |
|---|---|---|---|
| 2008/0090137 A1* | 4/2008 | Buck .................. | H01M 10/647 |
| | | | 429/120 |
| 2011/0104532 A1* | 5/2011 | Buck .................. | H01M 2/1229 |
| | | | 429/82 |
| 2012/0171545 A1* | 7/2012 | Hohenthanner .... | H01M 10/613 |
| | | | 429/120 |
| 2014/0205882 A1 | 7/2014 | Kepler et al. | |
| 2014/0248515 A1 | 9/2014 | Wayne et al. | |
| 2018/0366794 A1 | 12/2018 | Kim et al. | |

* cited by examiner

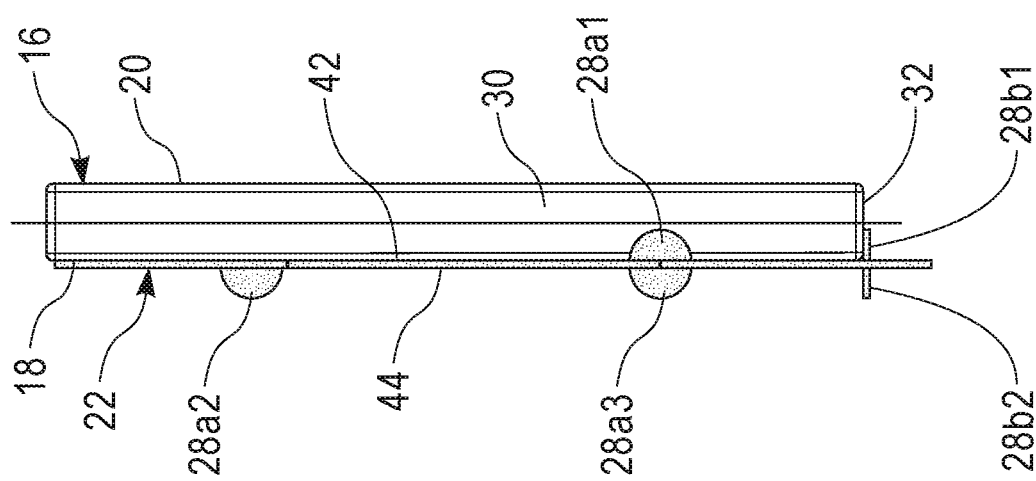
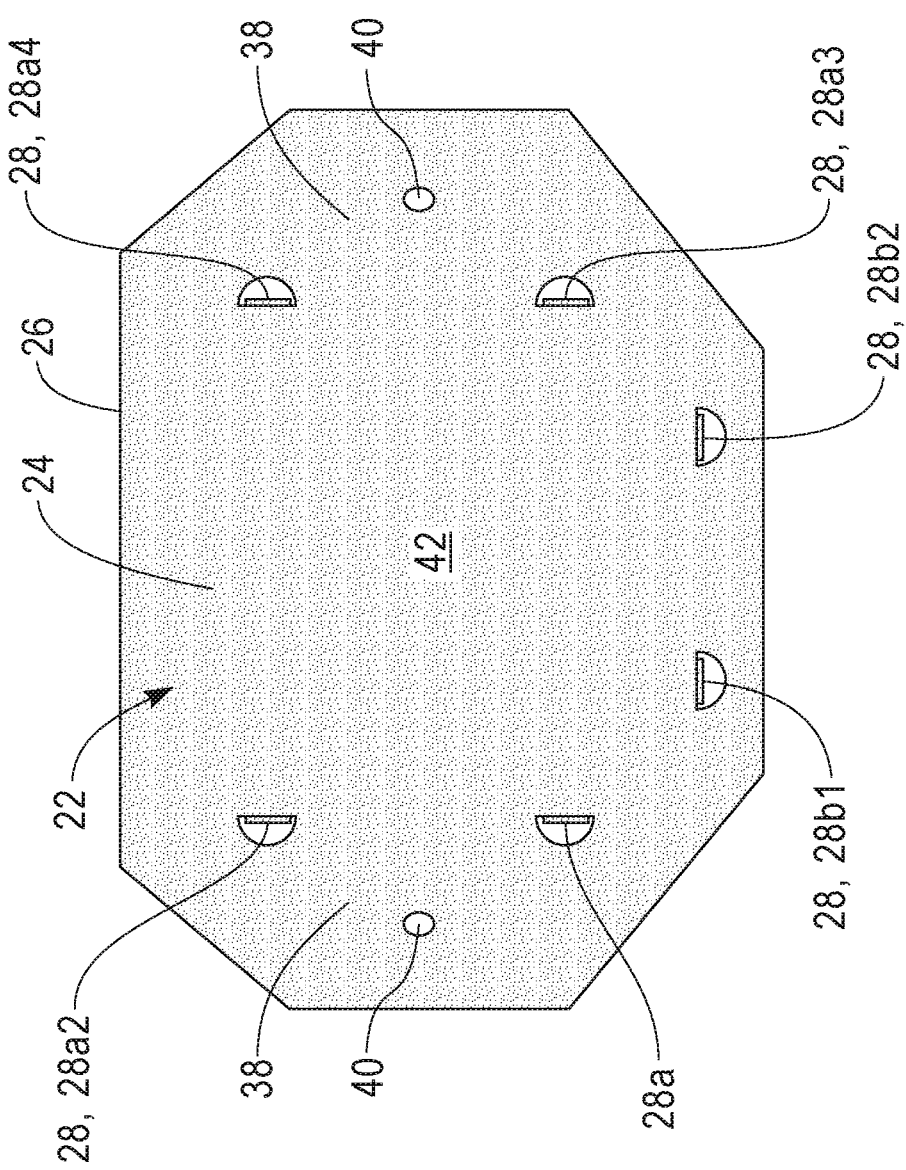

BATTERY CELL MODULE

FIELD OF DISCLOSURE

The present disclosure relates to a battery module including a plurality of battery cells and heat sink sequentially stacked into the module.

BACKGROUND

Battery cells are important energy storage devices. The battery cells typically comprise electrodes and an ion conducting electrolyte positioned between the electrodes. Battery packs that contain lithium ion batteries are increasingly popular with automotive applications and various commercial electronic devices because they are rechargeable and have no memory effect. Storing and operating lithium ion batteries at an optimal operating temperature are very important to allow the battery to maintain a charge for an extended period of time. One solution is to provide thermal cooling plates in contact with the cells to act as a heat sink.

Battery modules, such as those used in electric and hybrid electric vehicles, are manufactured so as to have as small a size and weight as possible. For this reason, battery cells which can be stacked with high integration and have a small weight to capacity ratio are usually used as a battery cell of the battery module.

For example, pouch and prismatic battery cells are typically assembled into battery modules and a plurality of the battery modules are assembled into a battery pack. The integration of pouch and prismatic cells into a battery module presents a challenge. The cells together with thermal heat sink plates must be firmly held in place and must be safe from damage. One solution is to secure the cells and cooling plates into frames within the module. The frames allow the cells to be stacked in the module. The frames also allow the cells to maintain alignment so that they can be electrically connected together. The stacked pouch or prismatic cells are placed into compression via module end plates. The frames, though supporting the cells, do not restrict the compression. The frames do not typically provide a heat transfer function. From a relative perspective, within a battery module, the weight of the frames typically makes up roughly 10% of the module weight. The extra volume and weight of the frames reduces cell capacity and adds extra cost.

SUMMARY

In one embodiment, a battery cell module of the present disclosure includes a housing having a stack of a plurality of battery cells. The stack includes a plurality of battery cells sequentially stacked within the housing. Each of the battery cells has first and second opposed faces. The stack further includes a plurality of heat sink plates sequentially interleaved between the plurality of battery cells. Each of the plurality of heat sink plates has a body extending in a first plane surrounded by an outer edge. The body has a plurality of mounting tabs. The mounting tabs are arranged to support a respective battery cell in the sequential stack within the housing such that the plurality of battery cells 16 are maintained in alignment within the housing.

In one embodiment, a method of assembling a battery cell module includes providing a housing, assembling a plurality of battery cells sequentially stacked within the housing, each of the battery cells having first and second opposed faces, assembling a plurality of heat sink plates sequentially interleaved between the plurality of battery cells within the housing, each of the plurality of heat sink plates having a body extending in a first plane surrounded by an outer edge, the body having a plurality of mounting tabs arranged to support a respective battery cell such that the plurality of battery cells are maintained in alignment within the housing.

BRIEF DESCRIPTION OF THE DRAWINGS

FIG. 2 is a plan view of one embodiment of a heat sink plate in accordance with the present disclosure.

FIG. 3 is a side view of one embodiment of the assembly of a battery cell and a heat sink plate in accordance with the present disclosure.

DETAILED DESCRIPTION

Figure 1:
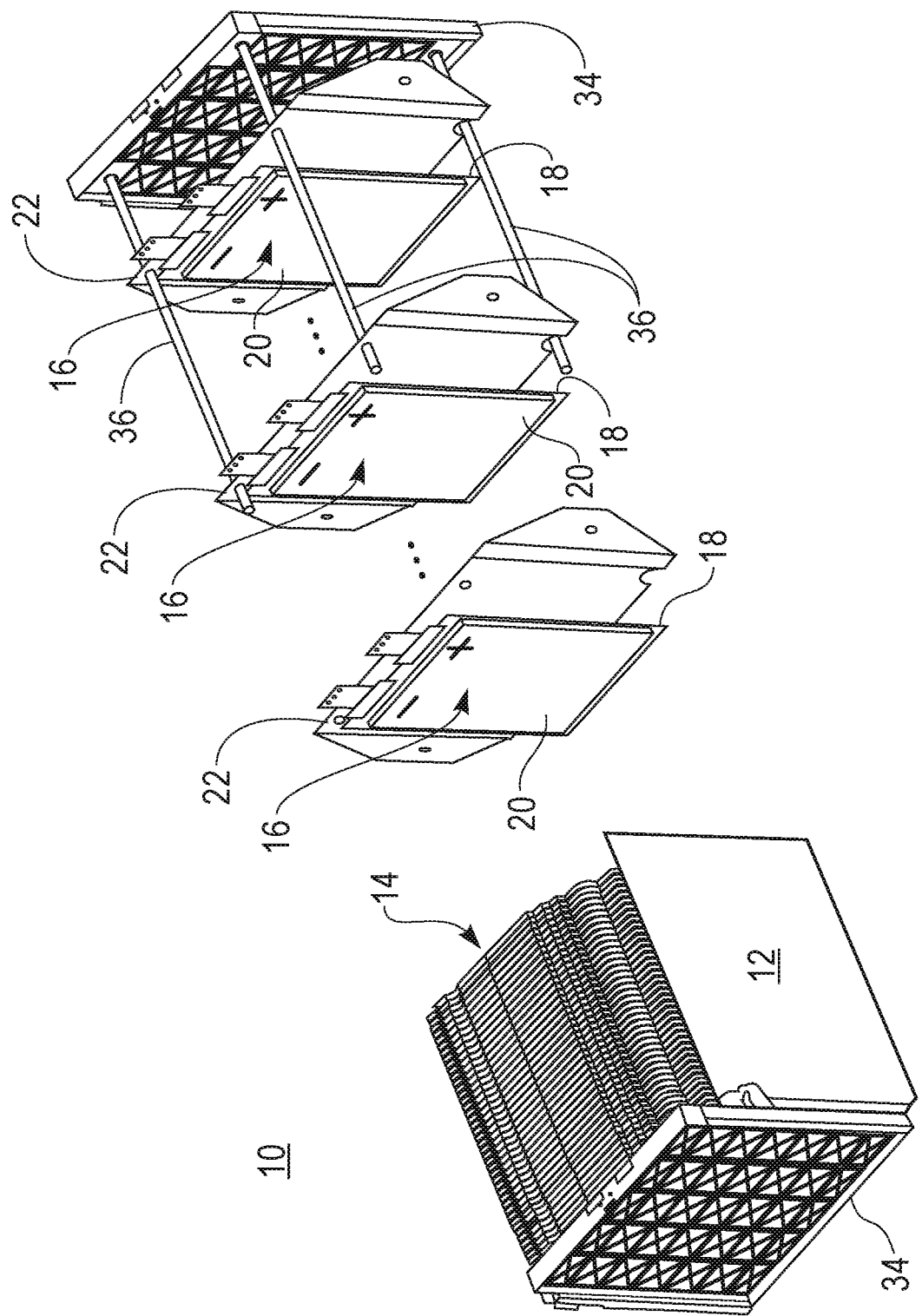
FIG. 1 is a partially exploded view of one embodiment of a battery cell module in accordance with the present disclosure.

FIG. 1 is a partially exploded view of one embodiment of a battery cell module 10 in accordance with the present disclosure. The battery module 10 includes a housing 12 having a stack 14 of a plurality of battery cells. As shown in the partial exploded view, the stack 14 includes a plurality of battery cells 16 sequentially stacked within the housing 12. Each of the battery cells 16 has first and second opposed faces 18 and 20. The stack 14 further includes a plurality of heat sink sections 22 sequentially interleaved between the plurality of battery cells 16. In one example the battery cells 16 and heat sink sections 22 are plate-shaped. As noted, the plate-shape refers to be approximately flat sections that can be rectangular, square, circular, polygonic or other shape depending upon the desired application and requirements.

As shown seen in FIGS. 2 and 3, each of the plurality of heat sink plates 22 has a plate-shaped body 24 extending in a first plane surrounded by an outer edge 26. The body 24 has a plurality of mounting tabs 28. The mounting tabs 28 arranged to support a respective battery cell in the sequential stack 14 within the housing 12 such that the plurality of battery cells 16 are maintained in alignment within the housing 12.

As seen in FIGS. 2 and 3, the plurality of mounting tabs 28 of each heat sink plate 22 includes at least one first mounting tab 28a extending in a second plane perpendicular to the first plane of the body 24 of the heat sink plate 22. The plurality of mounting tabs 28 also includes at least one second mounting tab 28b extending in a third plane perpendicular the first plane of the body 24 of the heat sink plate 22. The second and third planes are perpendicular to each other.

As shown in FIG. 3, the heat sink plates 22 include a first surface 42 and an opposed second surface 44. The mounting tabs 28 may all extend from one of the surfaces 42 or 44 or some of the mounting tabs 28 may extend from surface 42 and some may extend from surface 44. The mounting tabs 28 may be formed in the heat sink plate 22 using standard cutting and bending processes or the mounting tabs 28 may be formed separately from heat sink plates 22 and welded in place.

For example, in one embodiment, as shown in FIGS. 2 and 3, mounting tabs 28a1 and 28a4 extend from surface 42 and mounting tabs 28a2 and 28a3 extend from surface 44. Similarly, mounting tab 28b1 extends from surface 42 and mounting tab 28b2 extends from surface 44. In this embodiment, mounting tab 28a1 supports a first edge 30 of the battery cell 16 and mounting tab 28b1 supports a second edge 32 of the battery cell 16. The first and second edges 30, 32 of the battery cell 16 are perpendicular to each other. Mounting tab 28a4 which is blocked from view in FIG. 3, supports the edge of cell 16 opposed to edge 30. Mounting tabs 28a3, 28a4 and 28b2 are fee to support a second battery cell 16 in contact with surface 44 of heat sink plate 22.

Figure 4:
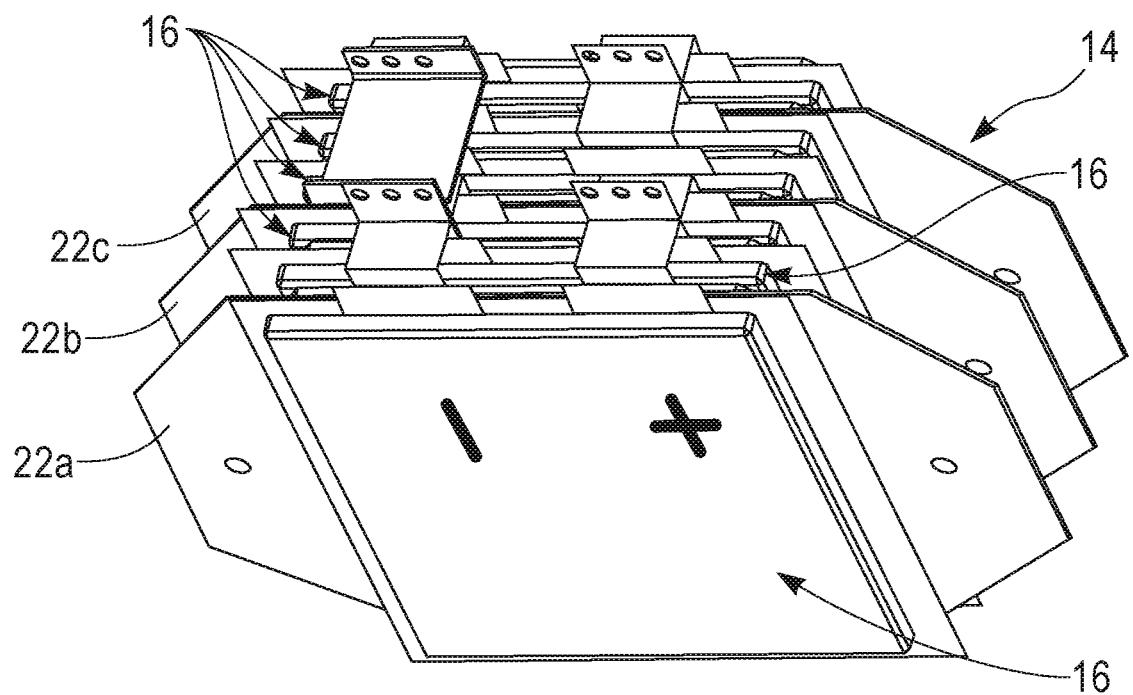
FIG. 4 is an isometric view of one embodiment of a stack of battery cells and heat sink plates in accordance with the present disclosure.

FIG. 4 is an isometric view of a stack 14 showing three heat sink plates 22a, 22b and 22c. Two battery cells 16 are sandwiched between the pair of heat sink plates 22a and 22b and two battery cells 16 are sandwiched between the pair of heat sink plates 22b and 22c.

Returning to FIG. 1, the housing 12 includes a pair of end plates 34 and a plurality of rods 36 extending between the pair of end plates 34. The pair of end plates 34 are configured to compress the plurality of battery cells 16 together within the housing such that the first face 18 of each battery cell 16 is in contact with the body 24 of a corresponding heat sink plate 22.

The assembled battery module 12 includes a plurality of the heat sink plates 22 and a plurality of the battery cells 16 disposed in the stack 14. The substantially planar surfaces 42 and 44 of heat sink plates 22 are configured to contact a face of a respective battery cell 16 of the battery stack 14. The substantially planar surfaces 42 and 44 are placed in a heat exchange relationship with the battery cell 16. For example, each one of the plurality of battery cells 16 will be in contact with the substantially planar surface 42 or 44 of one of the heat sink plates 22 under compression. It should be appreciated that each of the plurality of battery cells 16 in contact with one of the heat sink plates 22 exhibits a substantially uniform pressure distribution across the area of the contact.

Figure 5:
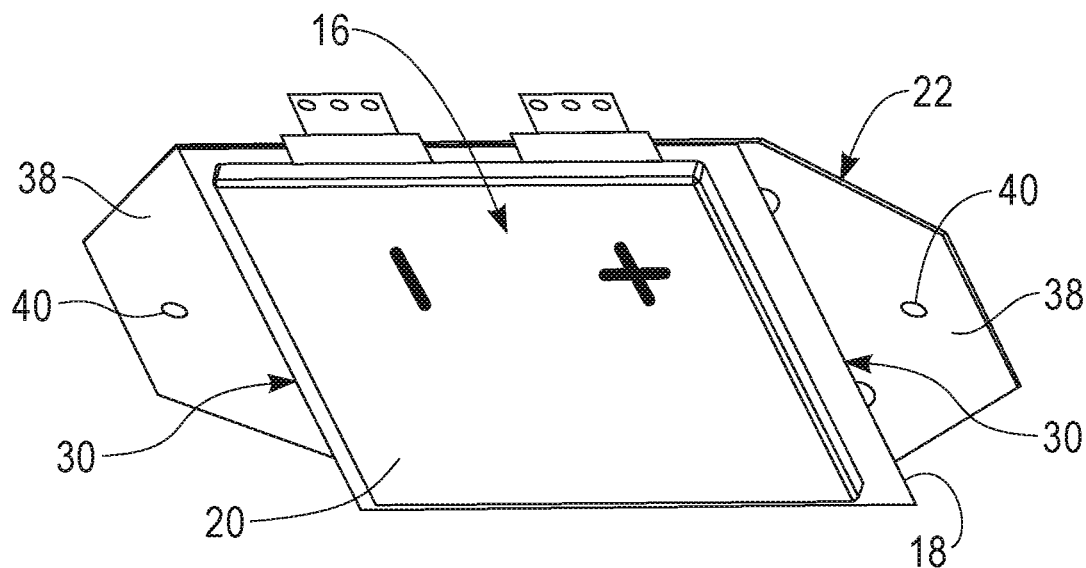
FIG. 5 is a plan view of one embodiment of the assembly of a battery cell and a heat sink plate in accordance with the present disclosure.

As shown in FIGS. 2 and 5, the heat sink plates 22 include fin portions 38. As shown in FIG. 5, the fin portions 38 extend beyond edges 30 of the battery cell 16. The heat sink plates 22 include a plurality of holes 40 for receiving the rods 36. In one embodiment, the plurality of holes 40 are located within the fin portions 38 of the heart sink plates 22.

In operation, battery cells generate heat as they are charged and discharged. The heat sink plates 22 are placed between the battery cells 16 and the fin portions 38 extend past the edges 30 of the battery cells 16, acting as fins for heat exchange. The fins can be used for convective cooling, or formed at right angles and used to allow conductive heat transfer. The heat sink plates 22 are formed from a thermally conductive material such as aluminum, copper, and the like, without limiting the scope of the present disclosure. Those skilled in the art will appreciate that numerous other shapes of the fin portion 38 can be utilized to provide a surface area for cooling or heating media, such as liquids, solids, or gasses, and the like.

In one alternative, the battery cell stack 14 shown in FIG. 4 may optionally include a plurality of gap pads sequentially interleaved between each pair battery cells 16.

In one embodiment, the battery cells 16 comprise a pouch cell. In one embodiment, the pouch cells are lithium-ion battery cells. It should be appreciated that other battery cells 16, employing a different structure and electrochemistry, may also be used within the scope of the present disclosure. In addition, other battery cell shapes and designs may be incorporated into other similarly-configured battery modules. The battery cell 16 may have a packaging (e.g., a metallic or plastic "casing" or "can") that encloses the internal components of the cell, including cathode and anode materials and a suitable electrolyte. The battery cell 16 may be any suitable type of lithium ion electrochemical cell, including but not limited to lithium nickel manganese cobalt oxide (NMC) and lithium titanate (LTO) battery cells, NMC/graphite battery cells, and so forth. By way of example, the positive electrode (cathode) active material and/or the negative electrode (anode) active material may be a lithium metal oxide (LMO) component or a blend of multiple LMO components. As used herein, lithium metal oxides (LMOs) may refer to any class of materials whose formula includes lithium and oxygen as well as one or more additional metal species (e.g., nickel, cobalt, manganese, aluminum, iron, or another suitable metal).

In one embodiment, the present disclosure combines the alignment features of a cell frame and the heat transfer capability of a heat sink plate together. In one embodiment, a thin heat sink plate includes features to allow alignment of the battery cells in the battery module. This would introduce no significant weight increase to the heat sinks. Combining the alignment feature into the fins assembly would allow the frame assemblies to be removed, realizing a substantial weight savings. The alignment features can be included in the heat sink fins using standard cutting and bending processes. This significantly simplifies the weight of a battery cell module. For many applications, the weight reduction by the elimination of the frames is critical to make the battery pack feasible for use. In addition, removing the frames also reduces material cost and assembly time.

Figure 6:
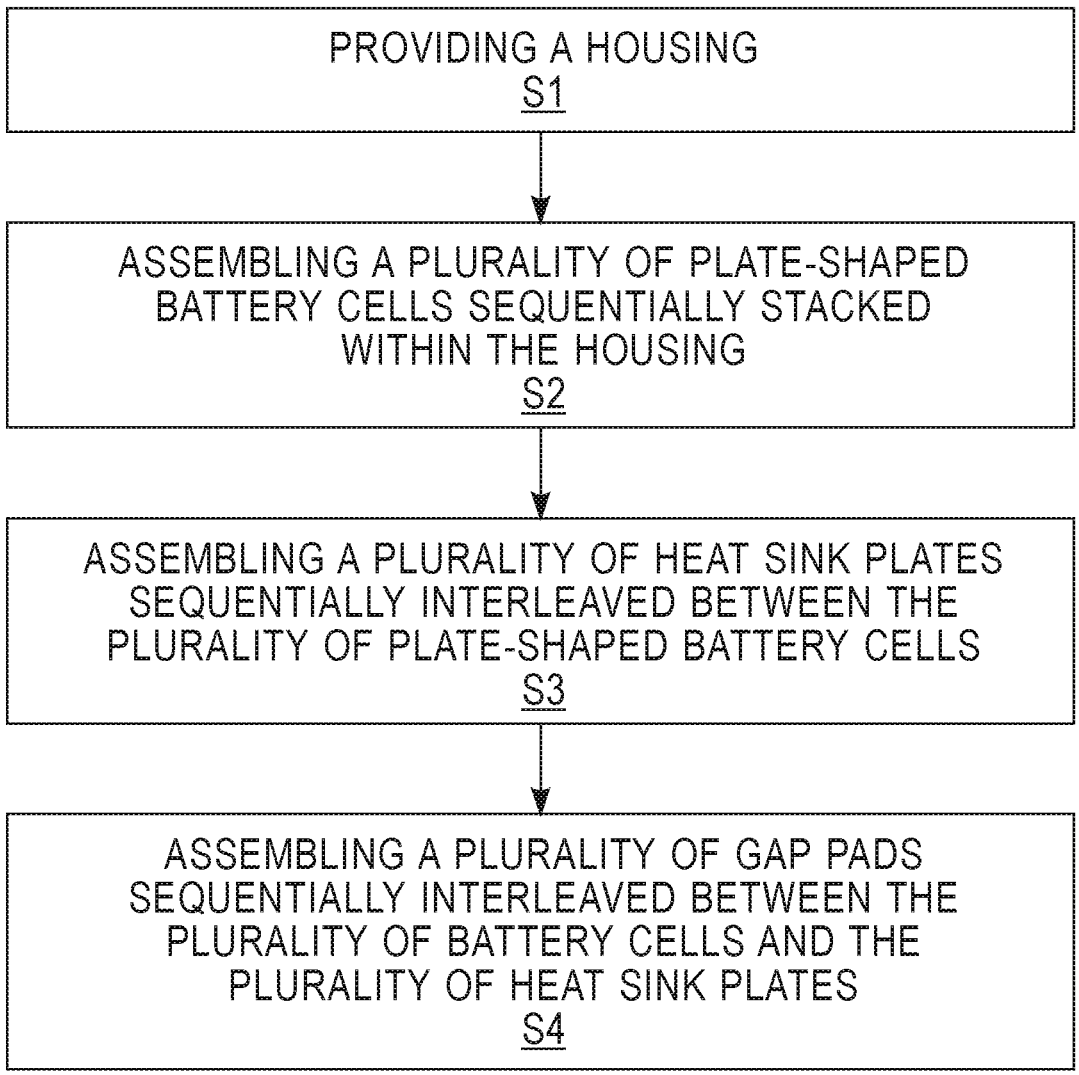
FIG. 6 is a flow diagram of one embodiment of a method of assembling a battery cell module in accordance with the present disclosure.

A method of assembling a battery cell module is also disclosed. As shown in FIG. 6, in one embodiment, the method includes providing a housing in step S1, assembling a plurality of plate-shaped battery cells sequentially stacked within the housing, each of the plate-shaped battery cells having first and second opposed faces in step S2, assembling a plurality of heat sink plates sequentially interleaved between the plurality of plate-shaped battery cells, each of the plurality of heat sink plates having a plate-shaped body extending in a first plane surrounded by an outer edge, the body having a plurality of mounting tabs arranged to support a respective battery cell such that the plurality of battery cells are maintained in alignment within the housing in step S3. IN one embodiment, the method optionally includes assembling a plurality of gap pads sequentially interleaved between the second face of plurality of battery cells and the second surface of the plurality of heat sink plates in step S4.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure not be limited by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A pouch battery cell module comprising:
   a housing;
   a plurality of pouch battery cells sequentially stacked within the housing, each of the pouch battery cells having first and second opposed faces; and
   a plurality of heat sink plates sequentially interleaved between the plurality of pouch battery cells within the housing, each of the plurality of heat sink plates having a body extending in a first plane surrounded by an outer edge, the body having a plurality of mounting tabs arranged to support a respective battery cell such that the plurality of pouch battery cells are maintained in alignment within the housing, wherein the plurality of mounting tabs of each of the heat sink plates comprise at least one first mounting tab and at least one second mounting tab, each of the at least one first mounting tab extending in a second plane perpendicular to the first plane of the body of the heat sink plate, the at least one second mounting tab extending in a third plane perpendicular to the first plane of the body of the heat sink plate, the second and third planes being perpendicular to each other, wherein the at least one first mounting tab is configured to support a first edge of the battery cell and the at least one second mounting tab receives a second edge of the battery cell, the first and second edges of the battery cells being perpendicular to each other, and wherein the plurality of mounting tabs are formed in the body of the heat sink plates.

2. The pouch battery cell module according to claim 1, wherein the housing includes a pair of end plates and a plurality of rods extending between the pair of end plates, and wherein each heat sink plate defines a plurality of holes for receiving the rods.

3. The pouch battery cell module according to claim 2, wherein the pair of end plates are configured to compress the plurality of pouch battery cells within the housing such that the first face of each pouch battery cell is in contact with the body of a corresponding heat sink plate.

4. The pouch battery cell module according to claim 2, wherein each heat sink plate includes fin portions extending beyond edges of the pouch battery cell.

5. The pouch battery cell module according to claim 4, wherein the plurality of holes are defined within the fin portions of each heart sink plate.

6. The pouch battery cell module according to claim 1, wherein each heat sink plate includes first and second surfaces, and wherein at least one of the first mounting tabs extends from the first surface and at least one of the second mounting tabs extends from the second surface.

7. The pouch battery cell module according to claim 6, wherein the pouch battery cell module further includes a plurality of gap pads sequentially interleaved between the second face of plurality of pouch battery cells and the second surface of the plurality of heat sink plates.

8. The pouch battery cell module according to claim 1, wherein each of the pouch battery cells comprises a lithium-ion battery cell.

9. The pouch battery cell module according to claim 6, wherein each of the first and second surfaces of at least one heat sink plate supports a pouch battery cell.

10. The pouch battery cell module according to claim 1, wherein the plurality of pouch battery cells are plate-shaped.

11. A method of assembling a pouch battery cell module comprising:
    providing a housing;
    assembling a plurality of pouch battery cells sequentially stacked within the housing, each of the pouch battery cells having first and second opposed faces; and
    assembling a plurality of heat sink plates sequentially interleaved between the plurality of pouch battery cells within the housing, each of the plurality of heat sink plates having a body extending in a first plane surrounded by an outer edge, the body having a plurality of mounting tabs arranged to support a respective pouch battery cell such that the plurality of pouch battery cells are maintained in alignment within the housing, wherein the plurality of mounting tabs of each heat sink plate comprise at least one first mounting tab and at least one second mounting tab, each of the at least one first mounting tab extending in a second plane perpendicular to the first plane of the body of the heat sink plate, the at least one second mounting tab extending in a third plane perpendicular to the first plane of the body of the heat sink plate, the second and third planes being perpendicular to each other, wherein the at least one first mounting tab supports a first edge of the pouch battery cell and the at least one second mounting tab supports a second edge of the pouch battery cell, the first and second edges of the pouch battery cell being perpendicular to each other, and wherein the plurality of mounting tabs are formed in the body of the heat sink plates.

12. The method of assembling a pouch battery cell module according to claim 11, wherein the housing includes a pair of end plates and a plurality of rods extending between the pair of end plates, and wherein each heat sink plate defines a plurality of holes for receiving the rods.

13. The method of assembling a pouch battery cell module according to claim 12, wherein the pair of end plates are configured to compress the plurality of pouch battery cells within the housing such that the first face of each pouch battery cell is in contact with the body of a corresponding heat sink plate.

14. The method of assembling a pouch battery cell module according to claim 12, wherein each heat sink plate includes fin portions extending beyond edges of the pouch battery cell.

15. The method of assembling a pouch battery cell module according to claim 14, wherein the plurality of holes are defined within the fin portions of each heart sink plate.

16. The method of assembling a pouch battery cell module according to claim 11, wherein each heat sink plate includes first and second surfaces, and wherein the first and second mounting tabs extend from the first surface.

17. The method of assembling a pouch battery cell module according to claim 16, further including assembling a plurality of gap pads sequentially interleaved between the second face of plurality of pouch battery cells and the second surface of the plurality of heat sink plates.

18. The method of assembling a pouch battery cell module according to claim 11, wherein each of the pouch battery cells comprises a lithium-ion battery cell.

19. The pouch battery cell module according to claim 11, wherein the plurality of pouch battery cells are plate-shaped.

\* \* \* \* \*